United States Patent
Caulfield et al.

(10) Patent No.: US 9,952,871 B2
(45) Date of Patent: Apr. 24, 2018

(54) CONTROLLING EXECUTION OF INSTRUCTIONS FOR A PROCESSING PIPELINE HAVING FIRST OUT-OF ORDER EXECUTION CIRCUITRY AND SECOND EXECUTION CIRCUITRY

(71) Applicant: ARM LIMITED, Cambridge (GB)

(72) Inventors: Ian Michael Caulfield, Cambridge (GB); Peter Richard Greenhalgh, Cambridge (GB); Simon John Craske, Cambridge (GB); Max John Batley, Cambridge (GB); Allan John Skillman, Cambridge (GB); Antony John Penton, Cambridge (GB)

(73) Assignee: ARM Limited, Cambridge (GB)

( * ) Notice: Subject to any disclaimer, the term of this patent is extended or adjusted under 35 U.S.C. 154(b) by 234 days.

(21) Appl. No.: 14/731,789

(22) Filed: Jun. 5, 2015

(65) Prior Publication Data
US 2016/0357554 A1    Dec. 8, 2016

(51) Int. Cl.
*G06F 9/38* (2006.01)

(52) U.S. Cl.
CPC .......... *G06F 9/3836* (2013.01); *G06F 9/3855* (2013.01); *G06F 9/3873* (2013.01); *G06F 9/3889* (2013.01)

(58) Field of Classification Search
CPC .................................................. G06F 9/3836
See application file for complete search history.

(56) References Cited

U.S. PATENT DOCUMENTS

| | | | | |
|---|---|---|---|---|
| 2007/0234018 A1* | 10/2007 | Feiste | ................. | G06F 9/30181 712/229 |
| 2009/0089602 A1* | 4/2009 | Bose | ....................... | G06F 1/206 713/340 |
| 2009/0293061 A1* | 11/2009 | Schwinn | ............... | G06F 9/3851 718/103 |
| 2011/0271126 A1 | 11/2011 | Hill | | |
| 2012/0317568 A1* | 12/2012 | Aasheim | ............. | G06F 9/45558 718/1 |
| 2014/0025930 A1* | 1/2014 | Lee | ....................... | G06F 12/084 712/205 |

(Continued)

OTHER PUBLICATIONS

A. Lukefahr et al., "Composite Cores: Pushing Heterogeneity into a Core", *Advanced Computer Architecture Laboratory*, University of Michigan, Dec. 10, 2012, 12 pages.

(Continued)

*Primary Examiner* — Jacob A Petranek
(74) *Attorney, Agent, or Firm* — Nixon & Vanderhye P.C.

(57) ABSTRACT

An apparatus comprises a processing pipeline comprising out-of-order execution circuitry and second execution circuitry. Control circuitry monitors at least one reordering metric indicative of an extent to which instructions are executed out of order by the out-of-order execution circuitry, and controls whether instructions are executed using the out-of-order execution circuitry or the second execution circuitry based on the reordering metric. A speculation metric indicative of a fraction of executed instructions that are flushed due to a mis-speculation can also be used to determine whether to execute instructions on first or second execution circuitry having different performance or energy consumption characteristics.

18 Claims, 5 Drawing Sheets

(56) References Cited

U.S. PATENT DOCUMENTS

| | | | |
|---|---|---|---|
| 2014/0173312 A1* | 6/2014 | Shippy | G06F 9/5094 |
| | | | 713/323 |
| 2014/0282565 A1* | 9/2014 | Jaleel | G06F 9/5044 |
| | | | 718/102 |
| 2015/0177821 A1* | 6/2015 | Senthinathan | G06F 9/30189 |
| | | | 713/324 |
| 2016/0004534 A1* | 1/2016 | Padmanabha | G06F 9/3836 |
| | | | 712/229 |
| 2016/0092274 A1* | 3/2016 | Singh | G06F 9/5027 |
| | | | 718/104 |

OTHER PUBLICATIONS

S. Padmanabha et al., "Trace Based Phase Prediction for Tightly-Coupled Heterogeneous Cores", Advanced Computer Architecture Laboratory, University of Michigan, Dec. 7, 2013, 13 pages.

* cited by examiner

| thread ID | perf metric(s) | execute unit |
|---|---|---|
| 0 | | 0 |
| 1 | | 1 |
| 2 | | 0 |
| . | | . |
| . | | . |
| . | | . |

CONTROLLING EXECUTION OF INSTRUCTIONS FOR A PROCESSING PIPELINE HAVING FIRST OUT-OF ORDER EXECUTION CIRCUITRY AND SECOND EXECUTION CIRCUITRY

BACKGROUND

Technical Field

The present technique relates to the field of data processing.

Technical Background

A processing pipeline may have out-of-order execution circuitry for performing out-of-order execution of instructions. By supporting execution of instructions in a different order to their original program order, performance can be improved because a later instruction which is independent of an earlier instruction need not wait for the earlier instruction to complete before being executed.

A processing pipeline may also support speculative execution of instructions, where instructions can be executed before it is known whether the result of the instruction will be valid. If the speculation is successful, this can improve performance because it is not necessary to wait for it to be known whether execution of the instruction will be valid before actually executing the instruction. In the event of a mis-speculation, the instruction can be flushed from the pipeline and mechanisms can be provided to restore the pipeline to the state it would have been in had the speculative instruction not executed.

SUMMARY

At least some examples provide an apparatus comprising:
a processing pipeline comprising out-of-order execution circuitry to perform out-of-order execution of instructions and second execution circuitry to execute instructions; and
control circuitry to monitor at least one reordering metric indicative of an extent to which instructions are executed out of order by the out-of-order execution circuitry and to control whether instructions are executed using the out-of-order execution circuitry or the second execution circuitry based on said at least one reordering metric.

At least some examples provide an apparatus comprising:
means for pipelined processing, comprising means for out-of-order execution of instructions and second means for executing instructions; and
means for monitoring at least one reordering metric indicative of an extent to which instructions are executed out of order by the means for out-of-order execution, and controlling whether instructions are executed using the means for out-of-order execution or the second means for executing based on said at least one reordering metric.

At least some examples provide a method comprising:
performing out-of-order execution of instructions using out-of-order execution circuitry of a processing pipeline comprising the out-of-order execution circuitry and second execution circuitry;
monitoring at least one reordering metric indicative of an extent to which instructions are executed out of order by the out-of-order execution circuitry; and
controlling whether instructions are executed using the out-of-order execution circuitry or the second execution circuitry based on said at least one reordering metric.

At least some examples provide an apparatus comprising:
a processing pipeline comprising first execution circuitry and second execution circuitry to execute instructions, wherein the first execution circuitry and the second execution circuitry having different performance or energy consumption characteristics; and
control circuitry to monitor at least one speculation metric indicative of a fraction of executed instructions flushed following a mis-speculation, and to control whether instructions are executed using the first execution circuitry or the second execution circuitry based on said at least one speculation metric.

At least some examples provide an apparatus comprising:
means for pipelined processing comprising first means for executing instructions and second means for executing instructions, wherein the first means for executing and the second means for executing have different performance or energy consumption characteristics; and
means for monitoring at least one speculation metric indicative of a fraction of executed instructions flushed following a mis-speculation, and controlling whether instructions are executed using the first means for executing or the second means for executing based on said at least one speculation metric.

At least some examples provide a method comprising:
executing instructions with a processing pipeline comprising first execution circuitry and second execution circuitry having different performance or energy consumption characteristics;
monitoring at least one speculation metric indicative of a fraction of executed instructions flushed following a mis-speculation; and
controlling whether instructions are executed using the first execution circuitry or the second execution circuitry based on said at least one speculation metric.

Further aspects, features and advantages of the present technique will be apparent from the following description of examples, which is to be read in conjunction with the accompanying drawings.

DESCRIPTION OF EXAMPLES

Figure 1:
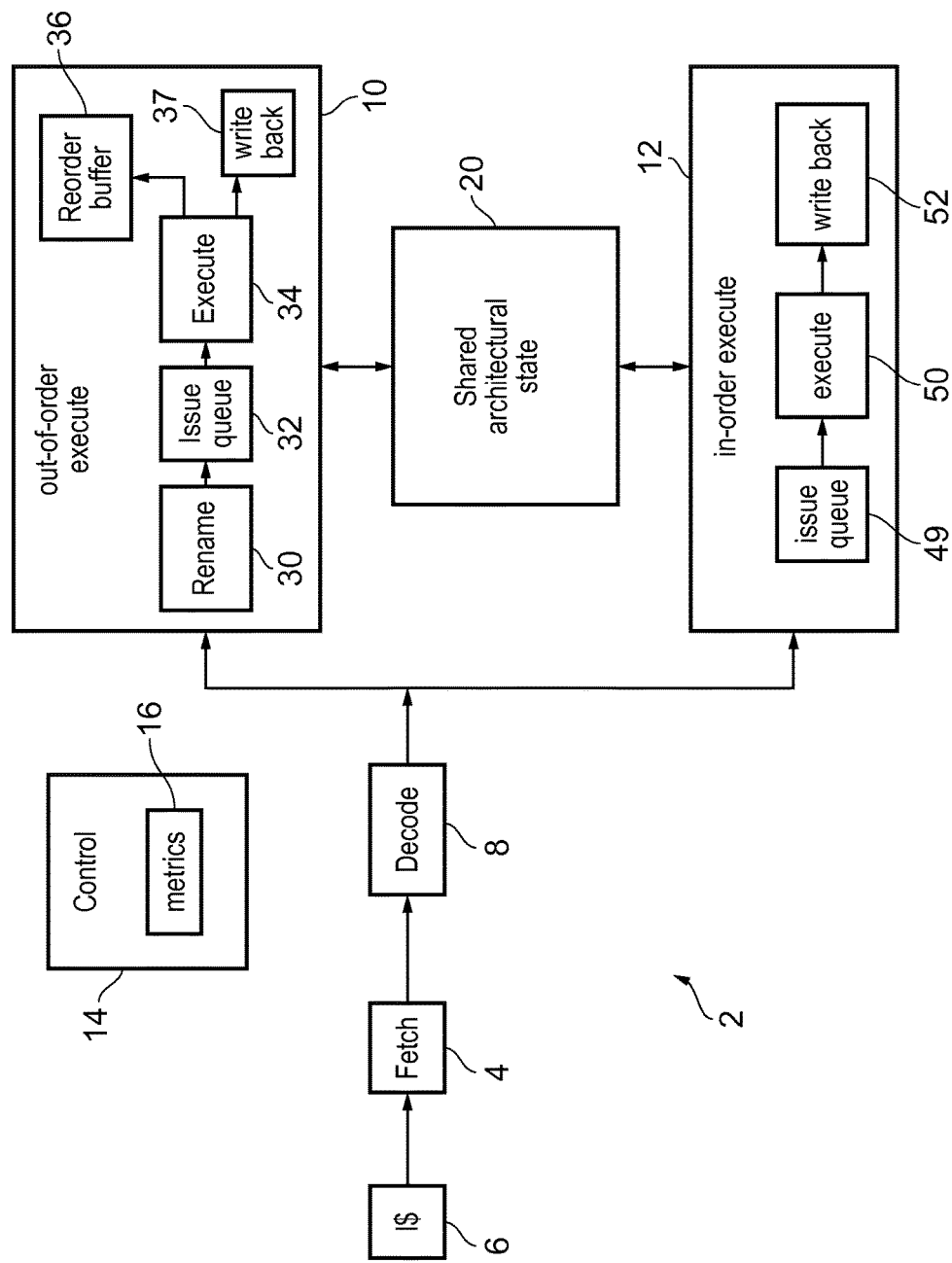
FIG. 1 schematically illustrates an example of an apparatus with a processing pipeline comprising out-of-order execution circuitry and in-order execution circuitry.

Some examples of the present technique will be discussed below.

A processing pipeline may include out-of-order execution circuitry for performing out-of-order execution of instructions as well as second execution circuitry for executing instructions. Some instructions may be able to be executed by either the out-of-order execution circuitry or the second execution circuitry. Control circuitry may be provided for controlling which execution circuitry is used for a given set of instructions. The control circuitry may control which execution circuitry is selected based on a reordering metric indicative of an extent to which instructions are executed out of order by the out-of-order execution circuitry. This provides a relatively efficient technique for determining whether instructions are likely to achieve the performance benefits arising from out-of-order execution on the out-of-order execution circuitry, or whether it may be more efficient to execute the instructions on the second execution circuitry.

For example, the out-of-order execution circuitry may provide certain processing resources (e.g. larger issue queues, reorder buffer, register renaming functionality etc.) for supporting out of order execution which may support greater potential performance, but may incur a greater cost in terms of energy consumption. For some groups of instructions, the out-of-order execution circuitry may provide a relatively large performance increase compared to the second execution circuitry so that the increased performance achieved with the out-of-order execution circuitry may justify the added energy consumption. However, for other groups of instructions there may be less difference in performance when the instructions are executed by the second execution circuitry compared to the out-of-order execution circuitry, in which case the second execution circuitry may be preferred to reduce energy consumption. The monitoring of the reordering metric gives an indication of whether the increased overhead of the out-of-order execution circuitry is justified given the amount of reordering being seen in practice during execution of instructions on the out-of-order execution circuitry.

In general the at least one reordering metric may be any metric of the "out-of-orderness" of a group of instructions, which can be derived from analyzing the execution of instructions on the out-of-order execution circuitry.

In one example the at least one reordering metric may comprise an indication of how many instructions are executed by the out-of-order execution circuitry before execution of an older instruction in the program order. For example, the metric could indicate the maximum number of instructions which have been observed to bypass a particular older instruction. Alternatively, the reordering metric could indicate an average number of instructions executed ahead of an older instruction (the average could be determined over a certain number of processing cycles, certain number of executed instructions or a certain unit of time). In general, if a greater number of instructions are executed ahead of an older instruction then this indicates that the group of instructions is making more use of the out-of-order functionality of the out-of-order execution circuitry and will benefit from continued execution on that out-of-order execution circuitry. If relatively few instructions are executing ahead of an older instruction, then this may indicate that the overhead associated with the out-of-order execution circuitry may not be justified and it may be more efficient to execute this group of instructions on the second execution circuitry.

An "older instruction" may be an instruction which is earlier in the program order than another instruction. Similarly, a "newer instruction" may be an instruction which is later in the program order than another instruction. The "program order" may be the order in which instructions are fetched from an instruction cache or memory. The instructions may be executed in a different order to the program order by the out-of-order execution circuitry.

The reordering metric could be tracked at different points of the pipeline. For example, an issue stage for issuing instructions for execution by the out-of-order execution circuitry could count the number of instructions which pass ahead of an earlier instruction in the program order, and the control circuitry may calculate the reordering metric based on this.

However, a relatively efficient technique may be to track the reordering metric with reference to a reorder buffer of the out-of-order execution circuitry. The reorder buffer may be provided for tracking completion of instructions. The reorder buffer may store a number of reorder buffer entries which correspond to pending instructions for which the pending instruction itself or at least one older instruction is still to be executed, and a reorder buffer entry may remain valid in the reorder buffer until the corresponding instruction has executed and there are no older instructions still to be executed. The reordering metric may be dependent on how many entries are valid in the reorder buffer. Reorder buffer entries will tend to remain valid for a longer time if there is a greater degree of out of order execution, and when reorder buffers entries remain valid for longer, it is likely that there will tend to be a greater number of valid entries in the reorder buffer. Therefore, an indication of the number of valid entries in the reorder buffer can be used as the reordering metric.

In some cases, the reordering metric could depend on the total number of valid entries in the reorder buffer (regardless of whether those entries relate to already executed instructions or still to be executed instructions). In other cases, the reordering metric could consider only those valid reorder buffer entries for which the corresponding instruction has already been executed, which can provide a more accurate indication of the extent of reordering because it more directly identifies the number of instructions which have executed ahead of an older instruction. Nevertheless, the total number of valid entries could also be used if desired.

The reordering metric could depend on the maximum number of valid reorder buffer entries seen during execution of a given set of instructions. Alternatively, the number of valid reorder buffer entries may be tracked over a period of time and the reordering metric may depend on an average number of valid reorder buffer entries, which could be determined over a certain window of time, number of executed instructions, or number of processing cycles. Hence, the number of valid reorder buffer entries (or valid reorder buffer entries for which the corresponding instruction has already been executed) may be sampled repeatedly and the average of the sampled numbers may be determined. The sampling points could be at arbitrary timings, or could be in intervals of a certain unit of time, number of processing cycles or number of executed instructions.

However, in one example the sampling points for determining an average number of reorder buffer entries may occur when a reorder buffer entry is invalidated from the reorder buffer. Invalidation of a given reorder buffer entry may occur when the corresponding instruction is retired, i.e. when that instruction and any older instructions have been executed. Upon invalidation of an entry in the reorder buffer, the control circuitry may count a current number of valid reorder buffer entries, and update the reordering metric based on the counted number. Sampling the number of valid, or valid and completed, reorder buffer entries each time the oldest instruction remaining is retired may provide a fairer indication of the extent of reordering, because all executed instructions contribute one sample to the average, and so have equal weights, which can avoid the average being distorted by a particular instruction which takes a long time to execute.

The control circuitry may compare the monitored reordering metric with a predetermined threshold and control whether subsequent execution of instructions is performed using the out-of-order execution circuitry or the second execution circuitry based on the comparison. For example, if the reordering metric indicates an extent of out of order execution greater than the extent represented by the threshold, the out-of-order execution circuitry can be selected, while otherwise the second execution circuitry can be selected.

In general, the reordering metric could be monitored for a group of instructions and then the control circuitry may control whether subsequent execution of the same group of instructions will be scheduled on the out-of-order execution circuitry or the second execution circuitry, based on the reordering metric. The group of instructions for which the performance is monitored may be any set of instructions which could be divided into relatively arbitrary chunks by the control circuitry. For example, the control circuitry could divide instructions being executed into groups of a certain size and then analyse the reordering metric separately for each group. One advantage of providing multiple execution circuits within the same processing pipeline is that this can reduce the switching overhead of switching execution from one execution circuit to the other (compared to systems having entirely separate cores), and so this can permit scheduling of instructions on the multiple execution circuits at a finer granularity than in previous systems, which can help to improve performance or energy efficiency by exploiting shorter periods when execution is preferred on one of the execution circuits or the other.

In some cases the processing pipeline may process instructions from a number of threads. For example each instruction may include a thread identifier specifying which thread that instruction belongs to. The control circuitry may monitor the at least one reordering metric separately for each thread and control whether a given thread is executed on the out-of-order execution circuitry or the second execution circuitry in dependence on the reordering metric monitored for that thread. In this way each thread can be classified as a thread preferred for execution on the out-of-order execution circuitry or a thread preferred for execution on the second execution circuitry, based on the amount of reordering observed during previous execution of that thread on the out-of-order execution circuitry.

The reordering metric need not be the only performance metric monitored by the control circuitry to determine which execution circuitry to use for executing instructions. Additional metrics could also be factored into the selection of execution circuitry. For example, the control circuitry could monitor a speculation metric indicative of a fraction of instructions executed (on either the out-of-order execution circuitry or the second processing circuitry) which are flushed due to a mis-speculation. For example, the mis-speculation could be due to a branch misprediction, load misspeculation, or any other event which causes speculative execution of an instruction to be incorrect, either because the instruction should not have executed at all, or because the instruction was executed with incorrect input operands. If there is a relatively high degree of misspeculation, then this may prevent out-of-order execution achieving increased performance since the repeated flushing of the pipeline may negate any gains achieved by out-of-order execution. Therefore, if the speculation metric indicates that the fraction of executed instructions which are flushed is higher than a given threshold, then the second execution circuitry could be selected for subsequent execution of instructions.

The speculation metric could represent the fraction of flushed instructions in different ways. For instance some examples may indicate the fraction of successfully executed instructions (which have not been flushed), which indirectly identifies the fraction of executed instructions which were flushed. Also, the speculation metric need not be expressed as an actual fraction. For example, if the metric is monitored over a fixed number of executed instructions, the metric could simply identify the total number of those instructions that were flushed or successfully executed, with the denominator of the fraction being implicit.

Some systems may consider both the reordering metric and the speculation metric when selecting which of first and second execution circuitry with different performance or energy consumption characteristics should be used to execute a given set of instructions. Other systems may only consider one or other of these metrics.

In general, the second execution circuitry may have different performance or energy consumption characteristics to the out-of-order execution circuitry. A given set of instructions may be capable of being executed on either the out-of-order execution circuitry or the second execution circuitry, but execution may result in different levels of performance or power consumption depending on which execution circuitry is selected. For example, the out-of-order execution circuitry may provide a greater maximum throughput of instructions, while the second execution circuitry may consume less energy. Note that while the maximum throughput of instructions on the out-of-order execution circuitry may be greater, this does not mean that all groups of instructions will actually achieve greater performance on the out-of-order execution circuitry than the second execution circuitry. The reordering metric provides an indication of the expected performance difference between the two execution circuits, and so can be used to schedule instructions on the appropriate execution circuit.

In some examples the second execution circuitry may perform in-order execution of instructions, and may not permit instructions to be executed in a different order from their program order. Hence, the reordering metric determined using the out-of-order execution circuitry can be used to classify whether it is preferable to execute the set of instructions on the out-of-order execution circuitry or the in-order execution circuitry. For instruction streams comprising instructions which depend on long latency memory operations (which would stall an in-order pipeline) followed by a significant number of instructions which are independent on the memory operations, the reordering metric will tend to indicate a greater degree of reordering and such instruction streams may achieve a relatively large performance benefit when executed on the out-of-order execution circuitry. On the other hand, if there are long latency memory operations with most of the following instructions dependent on the memory operations, then performance may be similar on the second execution circuitry compared to the out-of-order execution circuitry since it will be the latency of the memory accesses that affects performance more than the nature of the execution circuitry, and in this case the reordering metric may indicate a smaller amount of reordering and so the instructions could be scheduled for execution on the second execution circuitry.

The reordering metric can be used to determine at least when a set of instructions executed on the out-of-order execution circuitry should be migrated to the in-order second execution circuitry. When a group of instructions is currently executing in-order on the second execution circuitry then different approaches may be taken. In some cases a further performance metric may be monitored during execution of a group of instructions on the second execution circuitry and this may be used to control whether to continue executing those instructions on the in-order processing circuitry or move execution to the out-of-order execution circuitry. For example, the performance metric may depend on the number of cache misses, latency of memory accesses, or the number of instructions processed in a given time or number of processing cycles.

In other embodiments, a group of instructions executed in-order on the second execution circuitry may be migrated to the out-of-order execution circuitry in order to monitor the at least one reordering metric and then the control circuitry can determine whether those instructions should be executed using the out-of-order execution circuitry or the in-order execution circuitry. In this case, there may not be any need for monitoring any performance metric during execution on the second execution circuitry, since instructions classified for execution on the second execution circuitry can be periodically migrated to the out-of-order execution circuitry to check whether the second execution circuitry is still preferred for those instructions.

In other examples, the second execution circuitry may also comprise out-of-order execution circuitry, but with different performance characteristics to the out-of-order execution circuitry. For example the second execution circuitry may have a shorter issue queue or reorder buffer so that it cannot support as many instructions being executed ahead of an earlier instruction as the out-of-order execution circuitry, or may have a shorter pipeline, or a smaller number of instructions that can be executed in parallel per processing cycle. Hence, while the second execution circuitry may support some out-of-order execution and instructions, the maximum throughput of instructions may be lower than for the first out-of-order execution circuitry, but the second execution circuitry may have lower energy consumption. Where both execution circuits support out-of-order execution, the reordering metric could be monitored during execution on both execution circuits, or could be monitored only on the higher performance out-of-order execution circuit.

In some cases the out-of-order execution circuitry and the second execution circuitry may share at least one pipeline element which can be used regardless of whether instructions are being executed on the out-of-order execution circuitry or second execution circuitry. For example, the shared pipeline element could be an instruction cache, fetch circuitry, decode circuitry, a data pipeline, physical registers for storing operands, writeback circuitry, a data cache, status registers or configuration registers. By sharing some circuitry between the execution circuits, circuit area can be reduced and also the overhead of switching execution between the execution circuits can be reduced because there is less need to transfer architectural state or other information when transferring execution from one execution circuit to the other.

FIG. 1 schematically illustrates an example of a data processing apparatus having a processing pipeline 2 for processing instructions. The pipeline 2 includes a fetch stage 4 for fetching instructions from an instruction cache 6, a decode stage 8 for decoding the fetch instructions and first and second execute units 10, 12 for executing instructions. In this example the execute units include an out-of-order execution unit 10 and an in-order execution unit 12. The execute units 10, 12 may be capable of executing substantially the same types of instructions, but with different performance or energy efficiency characteristics. Control circuitry 14 is provided for controlling whether groups of instructions decoded by the decode stage 8 are supplied to the out-of-order execution unit 10 or the in-order execution unit 12 for execution. This decision may be based on a number of performance metrics 16 which are determined during execution of a group of instructions on the out-of-order execution unit 10 or the in-order execution unit 12.

The execute units 10, 12 share some shared architectural state 20, such as registers for storing operands to be processed in response to instructions, condition flags arising from execution of instructions which can be used to determine whether a condition is satisfied for a subsequent conditional instruction, system registers for storing configuration information for the execute units or other status information, and a program counter for indicating a next instruction to be processed, for example. By sharing architectural state 20, when a group of instructions being executed on one of the execute units 10, 12 is migrated to be executed on the other execute unit, execution can carry on from the point at which execution was halted on the previous execute unit, simply by accessing the shared architectural state.

The out-of-order execute unit includes a rename stage 30 for performing register renaming for mapping architectural register specifiers specified by the decoded instructions 8 to physical registers specifiers identifying one of a number of physical registers in the shared architectural state 20 to be accessed in response to the instructions. Any known register renaming technique can be used. The renamed instructions are provided to an issue queue 32 to await issue. An instructions may remain in the issue queue 32 until its operands are available, at which point the instruction can be issued to the execute unit 34. Instructions can be issued to the execute unit 34 in a different order from the original program order in which instructions were fetched from the instruction cache 6. Hence, if one instruction in the issue queue 32 is waiting for operands to become available (e.g. waiting for an access to memory), a later instruction which has its operands already available can be executed first. A reorder buffer 36 is provided in the out-of-order execution unit 10 for tracking the completion of execution of instructions. A writeback stage 37 writes results of instructions executed by the execute stage 34 to registers within the shared architectural state 20.

Figure 2:
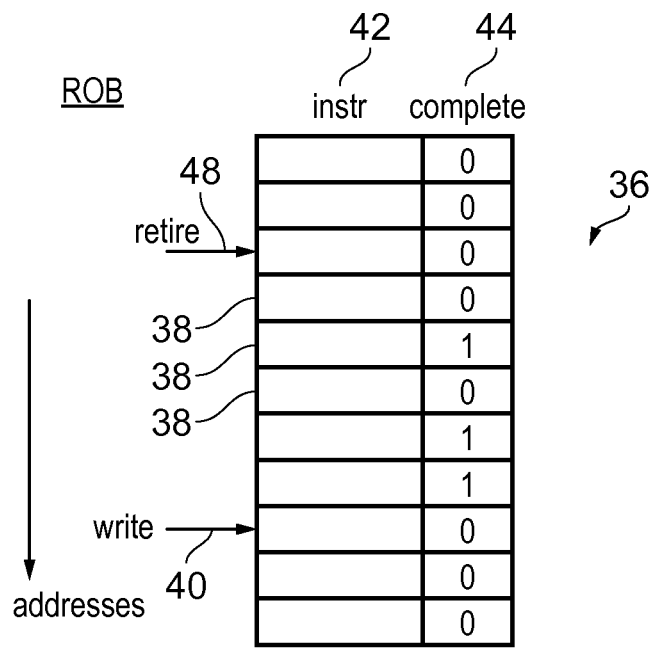
FIG. 2 shows an example of a reorder buffer of the out-of-order execution circuitry.

FIG. 2 shows an example of the reorder buffer 36. The reorder buffer includes a number of reorder buffer entries 38 each corresponding to an instruction which is pending in the issue queue 32 or the execute unit 34. The reorder buffer entries 38 are allocated to the reorder buffer 36 and invalidated from the reorder buffer 36 in age order corresponding to the original program order of the instructions being executed. When a new instruction is allocated to the issue queue 32, then a corresponding reorder buffer entry is written to the reorder buffer 36 at a location indicated by a write pointer 40, and the write pointer 40 is then incremented to point to the next location of the reorder buffer 36. Each reorder buffer entry includes a field 42 identifying the instruction, and a complete field 44 indicating whether the instruction has been executed yet or not. Alternatively, the instruction field 42 could be omitted if instructions within the pipeline comprise an indication (e.g. based on the write pointer 40 at the time an entry was allocated to the reorder buffer for that instruction) which allows it to be determined which reorder buffer entry corresponds to each instruction. A retire pointer 48 points to the reorder buffer entry 38 corresponding to the oldest remaining instruction which has not yet been executed. While the entry marked by the retirement pointer 48 may not yet have executed, some newer instructions may already have executed, as indicated by the complete fields 44 of subsequent reorder buffer entries. Once the oldest instruction has been executed, then the reorder buffer entry marked by the retire pointer 48 is invalidated and the retire pointer is incremented to indicate the next valid reorder buffer entry. This process continues and as more entries are allocated to the reorder buffer or removed from the reorder buffer on completion of the corresponding instruction, the write pointer 40 and the retirement pointer 48 cycle round and round the reorder buffer so that the buffer functions as a circular buffer or first in first out buffer (FIFO). The entries which lie behind the write pointer 40 and at or ahead of the retirement pointer 48 are valid entries corresponding to pending instructions which have not yet retired. The entries which lie at or ahead of the write pointer 40 and behind the retirement pointer 48 are invalid entries which do not correspond to any pending unretired instruction. Hence, by comparing addresses against the write pointer 40 and retirement pointer 48 with addresses of individual entries it can be determined which entries 38 of the reorder buffer 36 are valid or invalid. Alternatively, other embodiments could explicitly store a valid flag in each entry 38 to indicate whether it is valid or invalid, but this is not essential as the same information could be derived from the write pointer 40 and retirement pointer 48.

On the other hand, the in-order execute unit 12 does not support out-of-order execution and may not have rename stage 30 or reorder buffer 36. The in-order execute unit 12 may have a shorter issue queue 49 than the issue queue 32 of the out-of-order execute unit 10, and an execute stage 50 which may be less complex or be capable of instructions with lower maximum throughput than the execute stage 34 of the out-of-order execute unit 10. While FIG. 1 shows an example where the execute units 10, 12 have separate issue queues and writeback stages, in other examples these could be shared.

The control circuitry 14 may monitor a range of performance metrics 16 for tracking where groups of instructions should be executed on the out-of-order execution circuitry 10 or in-order execution circuitry 12. One example using the reorder buffer 36 is described with reference to FIGS. 3 and 4. While a workload is gaining a large benefit from out-of-order issue and execution, there will be a high proportion of instructions executing out of order. The reorder buffer keeps track of instructions which have executed, but are not yet retired due to earlier instructions not having executed. A metric of "out-of-orderness" can be derived by analyzing the average proportion of speculative instructions in the reorder buffer which are complete. A high proportion indicates that execution is highly out-of-order and benefits from running on the out-of-order execution unit 10, while a low proportion would indicate execution could run on the in-order execution unit 12 with less loss of performance and greater energy efficiency.

Figure 3:
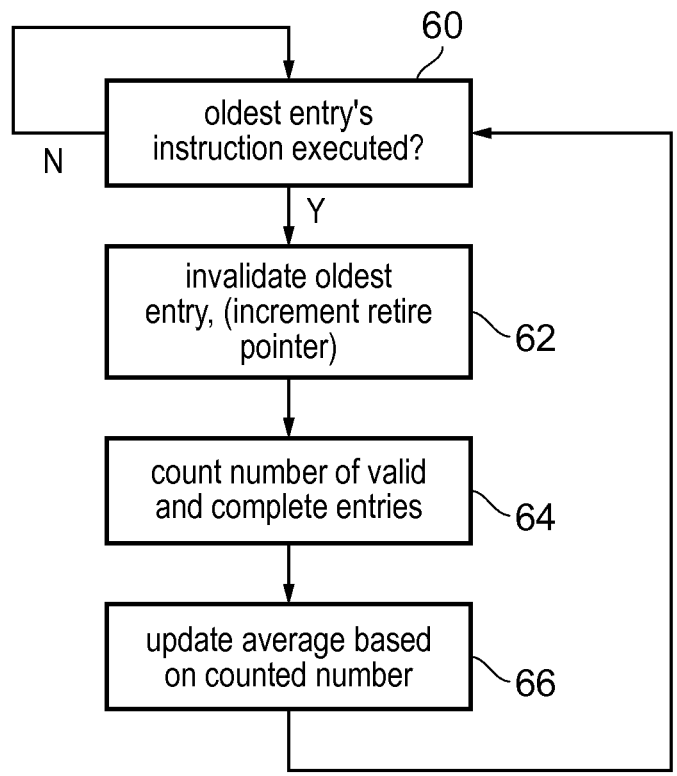
FIG. 3 shows an example method of tracking a reordering metric using the reorder buffer.

FIG. 3 shows a method of tracking the performance metric using the reorder buffer. At step 60 the control circuitry 14 determines whether the instruction corresponding to the oldest entry in the reorder buffer (the entry marked by the retire pointer 48) has been executed. For example, each instruction in the out-of-order execution unit could be tagged with an indication of the current value of the write pointer 40 at the time its entry was added to the reorder buffer 36, and the oldest instruction may be determined to have executed when an instruction having a tag matching the current value of the retire pointer 48 is executed. The method waits at step 60 until the oldest instruction has been executed, and then at step 62 the oldest reorder buffer entry indicated by the retire pointer 48 is invalidated, by incrementing the retire pointer 48. At step 64 the control circuitry 14 counts the number of valid and complete entries in the reorder buffer, which have the complete field 44 set and which have addresses A which satisfy the following conditions:

if W>R: R≤A<W if W<R: A≥R OR A<W, where W is the write pointer 40 and R is the retire pointer 48.

(if W=R then the number of valid entries is 0).

Hence, the number of valid entries is counted. In some examples step 64 may be performed before step 62 so that the oldest entry being invalidated is itself included in the counted number of valid and complete entries, while in other examples step 64 may occur after step 62 as shown in FIG. 3 so that the oldest entry is not counted as one of the valid and complete entries. At step 66 a running average of the number of valid and complete reorder buffer entries is updated based on the number counted at step 64. Hence, each time an entry is invalidated, the average is updated to develop a reordering metric which depends on the average number of valid completed entries in the reorder buffer, which indicates the extent to which instructions are executed out of order.

Figures 4, 8:
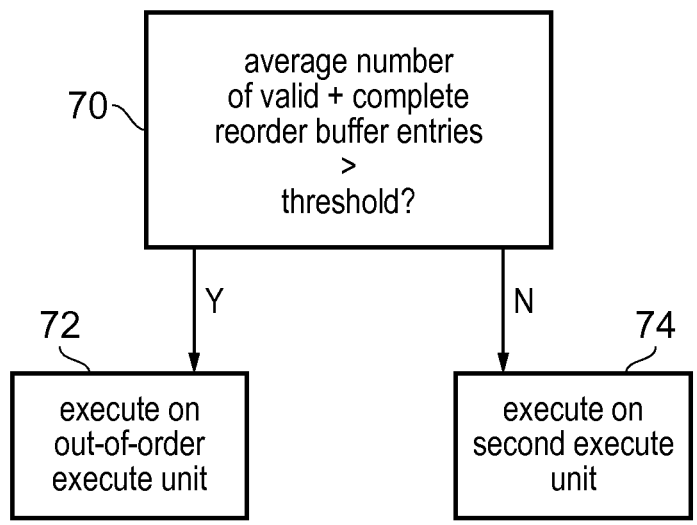
FIG. 4 shows an example method of controlling whether instructions are executed on the out-of-order execution unit or a second execution unit based on the reordering metric.
FIG. 8 shows an example of selecting which execution circuitry is used to execute threads of instructions based on performance metrics monitored for the respective threads.

FIG. 4 shows a method of determining which execution unit to use. At step 70 it is determine whether the reordering metric (the average number of valid and complete reorder buffer entries determined according to FIG. 3) determined during execution of a group of instructions on the out-of-order execute unit 10 is greater than a threshold. If so then at step 72 the group of instructions is issued for execution on the out-of-order execute unit 10. If the average is not larger then the threshold then at step 74 the group of instructions is issued to the in-order execute unit 12.

Figure 5:
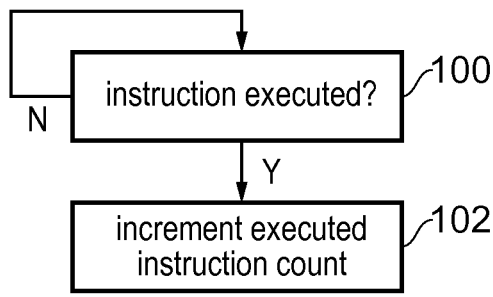
FIGS. 5 to 7 show an example of controlling execution of instructions based on a speculation metric indicative of a fraction of instructions that are flushed due to a mis-speculation.
Figure 6:
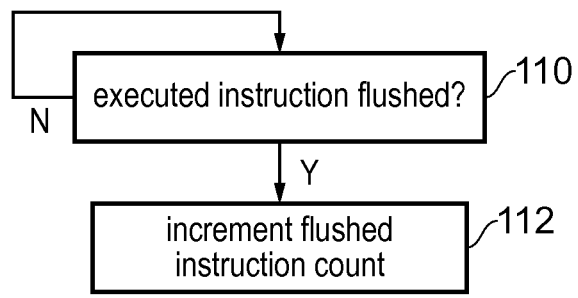
Figure 7:
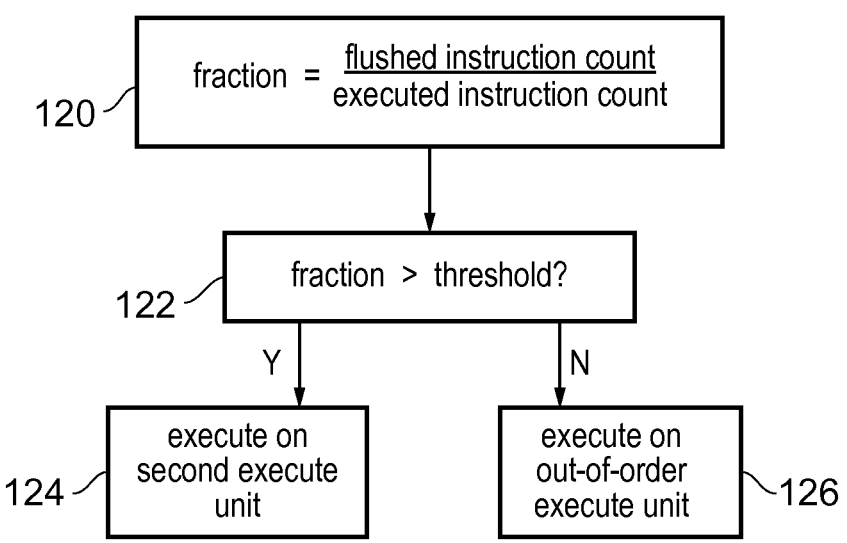

FIGS. 5 to 7 show another example of tracking a performance metric for determining which execute unit to use. At least the out-of-order execute unit 10, and possibly the in-order execute unit 12 as well, may support speculative execution, for example branch prediction or load speculation, so that instructions may be executed speculatively before it is known whether the result of those instructions will be valid. If the speculation is correct, this can provide improved performance, but if there is a misspeculation and a speculatively executed instruction has to be flushed from the pipeline, this may reduce performance, which may negate the benefits of using the out-of-order execution unit 36. Therefore, if during execution of a given group of instructions, a relatively large fraction of the speculative instructions are flushed, then it may be preferable to continue execution on the in-order execute unit 12 which provides greater energy efficiency.

As shown in FIG. 5, at step 100 the control circuitry 14 monitors whether an instruction has been executed. If so, then at step 102 the control unit 14 increments an executed instruction count which indicates the total number of executed instructions.

As shown in FIG. 6, at step 110 the control circuitry determines whether a speculatively executed instruction has been flushed due to a misspeculation (e.g. a branch misprediction or a load misspeculation). If so, then at step 112 the control circuitry 14 increments a flushed instruction count which indicates a number of flushed instructions.

The executed instruction count and incremented flushed instruction count can be reset periodically so that these metrics can be monitored for groups of instructions between successive resets of the counters.

As shown in FIG. 7, at step 120 the control circuitry 14 determines a fraction of instructions that have been flushed by dividing the flushed instruction count by the executed instruction count. At step 122 the control circuitry 14 determines whether the fraction is greater than the threshold. If so then at step 124 the control circuitry 14 determines that the corresponding group of instructions should be executed on the in-order execute unit 12 to reduce the performance loss by incorrect speculation. On the other hand if the fraction is not greater than the threshold then at step 126 the control circuitry 14 determines that the instructions may be executed on the out-of-order execution unit 10.

In some cases, step 122 may be extended to check the reordering metric discussed above in addition to the flushed instruction fraction, with a group of instructions being executed on the out-of-order execute unit when the flushed instruction fraction is smaller than the threshold and the reordering metric indicates a higher than a certain threshold amount of reordering, while the second execute unit 12 is selected when the flushed instruction fraction is greater than the threshold or the reordering metric indicates less than the threshold amount of reordering.

While FIGS. 5-7 show an example where the flushed instruction fraction is expressed in terms of a fraction of instructions that are flushed, it will be appreciated that in other examples the metric may specify the fraction of instructions which are successfully executed without flushing (which will indirectly identify the fraction of flushed instructions as well). Also, if the flushed instruction fraction is determined over a fixed number of executed instructions, the method of FIG. 5 could be omitted and step 120 of FIG. 7 may simply compare the number of flushed instructions with a threshold.

As shown in FIG. 8, the control circuitry 14 may monitor separate performance metrics for a number of threads of instructions and record this in a table in correspondence with a thread identifier identifying the particular thread. Instructions may be passed through the pipeline together with a thread identifier identifying the corresponding thread, and when instructions from a given thread are executed, the control circuitry 14 may update the corresponding performance metrics for that thread. The control circuitry 14 may then use the performance metric(s) for a given thread to control which of the execute units 10, 12 should be used for subsequent execution of that thread. In this way threads can be classified as "high performance threads" which are more likely to yield a performance benefit when executed on the out-of-order execute unit 10 or "lower power threads" which may be more efficient to execute on the in-order execution unit 12.

The mechanisms discussed above may be used for determining whether code executing on the out-of-order execution unit 10 should continue executing on that unit or would be more efficient to migrate to the in-order execute unit 12. For other code which is currently executing on the in-order execute unit 12, either a separate performance analysis mechanism may be provided for generating in-order performance metrics based on execution on the in-order execute unit 12 which can be used to determine whether to migrate the code to the out-of-order execute unit 10, or it is possible to periodically migrate threads or groups of instructions to the out-of-order execution unit 10 for monitoring of the reordering metric. While periodically migrating threads to the out-of-order execution unit 10 may increase power consumption slightly compared to continuing execution on the in-order execution unit 12, the reordering metric obtained in this way may provide a better indication of whether to classify instructions for execution on the out-of-order execution unit 10 or the in-order execution unit 12.

Figure 9:
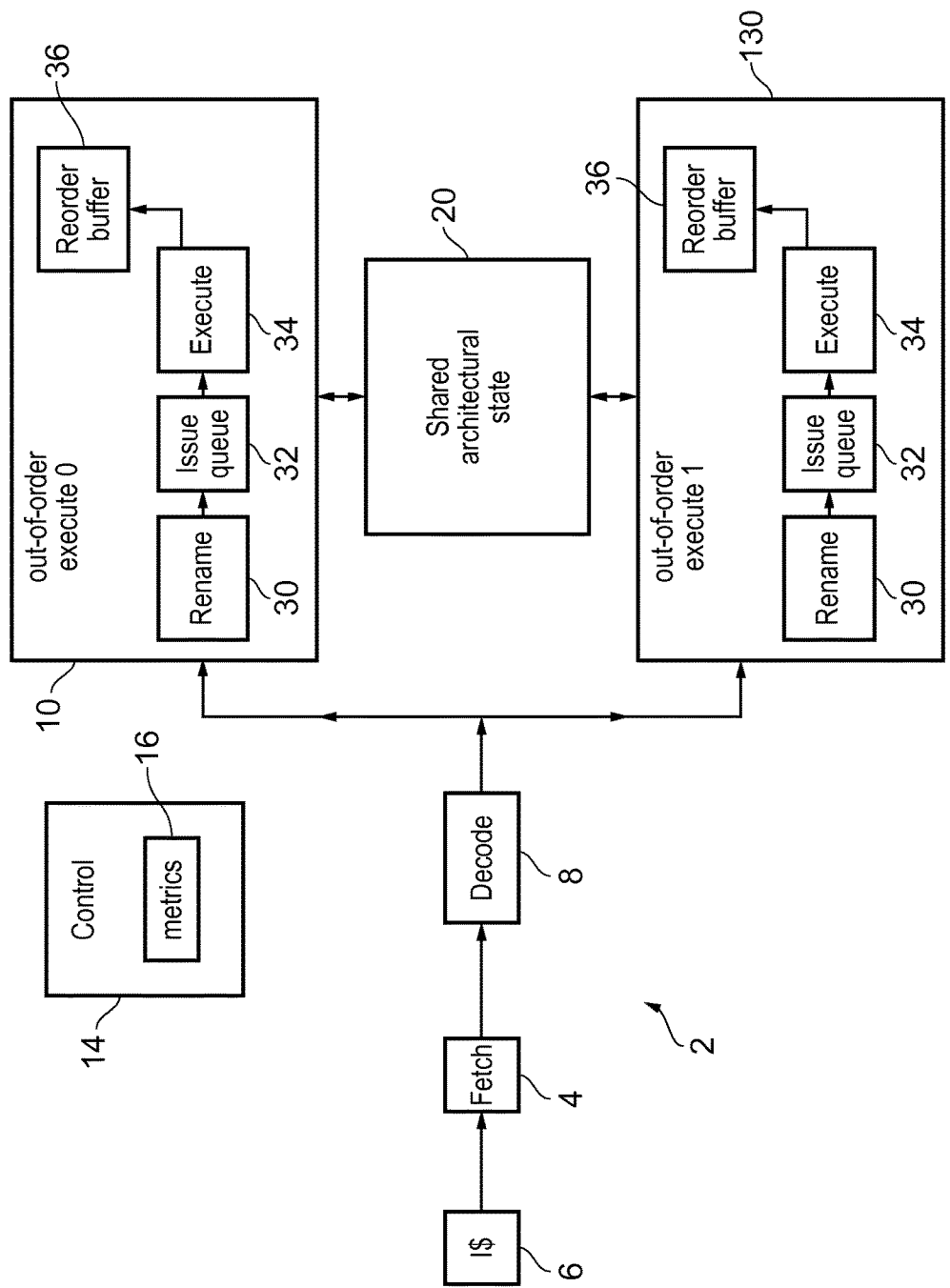
FIG. 9 shows a second example of a pipeline comprising two instances of out-of-order execution circuitry.

FIG. 1 shows an example where the second execution unit 12 is an in-order execute unit which performs in-order execution of instructions. However this is not essential. As shown in FIG. 9, in other examples the second execution unit may be an out-of-order execution unit 130 which also supports out-of-order execution, but with different performance or energy consumption characteristics compared to the first out-of-order execution unit 10. The elements of the pipeline 2 other than the second out-of-order execution unit 130 are the same as in FIG. 1. However, in this example the out-of-order execution unit 130 includes a rename stage 30, issue queue 32, execute stage 34 and reorder buffer 36 in a similar way to the first out-of-order execution unit 10. While both execute units 10, 130 may support out-of-order execution, the first out-of-order execute unit 10 may support a greater performance than the second out-of-order execute unit 130 while the second out-of-order execute unit 130 may be more power efficient. For example the issue queue 32 and/or reorder buffer 36 of the first out-of-order execute unit 10 may have space for a larger number of instructions than the issue queue 32 and/or reorder buffer 36 in the second out-of-order execute unit 130 so that a greater degree of reordering is possible. Also, the execute stage 34 of the first out-of-order execute unit 10 may be able to execute more instructions in parallel than the execute stage 34 of the second out-of-order execution unit 130. In an example with more than one out-of-order execute unit, the control circuitry 14 could monitor reordering metrics 16 during execution of instructions on one or both execute units 10, 130 and use this to track which execute unit to use for a given set of instructions.

While FIGS. 1 and 9 show control circuitry 14 being provided separately from the rest of the pipeline 2, in other examples the monitoring of performance metrics may be executed by the pipeline itself, so that the pipeline itself may be considered to be the control circuitry. For example, one of the threads may be a performance monitoring thread which tracks performance metrics during execution of other threads. However, it may be more efficient to provide a control circuitry 14 in hardware if possible to avoid the performance monitoring impacting on the performance being monitored.

While FIGS. 1 and 9 show an example with two execute units for executing instructions, it would be appreciated that similar techniques could be applied with systems having three or more execute units, for which similar performance metrics can be used to determine which unit to select for execution of instructions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
a processing pipeline comprising out-of-order execution circuitry to perform out-of-order execution of instructions and second execution circuitry to execute instructions; and
control circuitry to monitor at least one reordering metric indicative of an extent to which instructions are executed out of order by the out-of-order execution circuitry and to control whether instructions are executed using the out-of-order execution circuitry or the second execution circuitry based on said at least one reordering metric,
wherein the control circuitry is configured to control whether instructions are executed using the out-of-order execution circuitry or the second execution circuitry based on a comparison of said at least one reordering metric and at least one threshold, and
wherein for code executed on the second execution circuitry, the control circuitry is configured to switch the code to execute on the out-of-order execution circuitry when the at least one reordering metric indicates that instructions are executed out of order to a greater extent than represented by the at least one threshold.

2. The apparatus according to claim 1, wherein the out-of-order execution circuitry and the second execution circuitry have different performance or energy consumption characteristics.

3. The apparatus according to claim 1, wherein the at least one reordering metric is indicative of a number of instructions that are executed by the out-of-order execution circuitry before execution of an older instruction.

4. The apparatus according to claim 1, wherein the at least one reordering metric is indicative of an average number of instructions that are executed by the out-of-order execution circuitry before execution of an older instruction.

5. The apparatus according to claim 1, wherein the out-of-order execution circuitry comprises a reorder buffer to store a plurality of reorder buffer entries corresponding to pending instructions for which the pending instruction or at least one older instruction is still to be executed.

6. The apparatus according to claim 5, wherein the out-of-order execution circuitry is configured to invalidate a given reorder buffer entry of the reorder buffer when the corresponding pending instruction and any older instructions have been executed.

7. The apparatus according to claim 5, wherein the at least one reordering metric is dependent on a number of valid reorder buffer entries in the reorder buffer.

8. The apparatus according to claim 7, wherein said number of valid reorder buffer entries in the reorder buffer comprises at least one of:
a maximum number of valid reorder buffer entries;
an average number of valid reorder buffer entries;
a maximum number of valid reorder buffer entries for which the corresponding instruction has been executed; and
an average number of valid reorder buffer entries for which the corresponding instruction has been executed.

9. The apparatus according to claim 7, wherein upon invalidation of a reorder buffer entry in the reorder buffer, the control circuitry is configured to determine a current number of valid reorder buffer entries, and to update said at least one reordering metric based on the current number.

10. The apparatus according to claim 1, wherein the processing pipeline is configured to process instructions from a plurality of threads of instructions; and
the control circuitry is configured to monitor the at least one reordering metric separately for the plurality of threads, and to control whether a selected thread of instructions is executed on the out-of-order execution circuitry or the second execution circuitry in dependence on the at least one reordering metric monitored for the selected thread.

11. The apparatus according to claim 1, wherein the control circuitry is configured to control whether instructions are executed using the out-of-order execution circuitry or the second execution circuitry based on said at least one reordering metric and at least one speculation metric indicative of a fraction of executed instructions flushed following a mis-speculation.

12. The apparatus according to claim 11, wherein the control circuitry is configured to control the second execution circuitry to execute the instructions when the at least one speculation metric indicates that the fraction of executed instructions which are flushed following a mis-speculation is higher than a predetermined threshold.

13. The apparatus according to claim 1, wherein the second execution circuitry is configured to perform in-order execution of instructions.

14. The apparatus according to claim 13, wherein the control circuitry is configured to monitor at least one performance metric during execution of instructions by the second execution circuitry, and to control whether instructions are executed using the out-of-order execution circuitry or the second execution circuitry based on said at least one performance metric.

15. The apparatus according to claim 14, wherein the control circuitry is configured to migrate a group of instructions executed by the second execution circuitry to the out-of-order execution circuitry for monitoring of said at least one reordering metric.

16. The apparatus according to claim 1, wherein the second execution circuitry is configured to perform out-of-order execution of instructions; and
the control circuitry is configured to monitor said at least one reordering metric during execution of instructions on both the out-of-order execution circuitry and the second execution circuitry.

17. An apparatus comprising:
means for pipelined processing, comprising means for out-of-order execution of instructions and second means for executing instructions; and
means for monitoring at least one reordering metric indicative of an extent to which instructions are executed out of order by the means for out-of-order execution, and controlling whether instructions are executed using the means for out-of-order execution or the second means for executing based on said at least one reordering metric, wherein the means for monitoring is configured to control whether instructions are executed using the means for out-of-order execution or the second means for executing based on a comparison of said at least one reordering metric and at least one threshold, and wherein for code executed on the second means for executing, the means for monitoring is configured to switch the code to execute on the means for out-of-order execution when the at least one reordering metric indicates that instructions are executed out of order to a greater extent than represented by the at least one threshold.

18. A method comprising:

performing out-of-order execution of instructions using out-of-order execution circuitry of a processing pipeline comprising the out-of-order execution circuitry and second execution circuitry;

monitoring at least one reordering metric indicative of an extent to which instructions are executed out of order by the out-of-order execution circuitry; and controlling whether instructions are executed using the out-of-order execution circuitry or the second execution circuitry based on said at least one reordering metric, wherein said method further comprises:

controlling whether instructions are executed using the out-of-order execution circuitry or the second execution circuitry based on a comparison of said at least one reordering metric and at least one threshold, and wherein for code executed on the second execution circuitry, the control circuitry is configured to switch the code to execute on the out-of-order execution circuitry when the at least one reordering metric indicates that instructions are executed out of order to a greater extent than represented by the at least one threshold.

* * * * *